US010664471B2

United States Patent
Cao et al.

(10) Patent No.: US 10,664,471 B2
(45) Date of Patent: *May 26, 2020

(54) SYSTEM AND METHOD OF QUERY PROCESSING WITH SCHEMA CHANGE IN JSON DOCUMENT STORE

(71) Applicant: International Business Machines Corporation, Armonk, NY (US)

(72) Inventors: Zhao Cao, Beijing (CN); Yuan Feng, Beijing (CN); Tao Li, Beijing (CN); Lanjun Wang, Beijing (CN); Lin Hao Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 271 days.

This patent is subject to a terminal disclaimer.

(21) Appl. No.: 15/857,753

(22) Filed: Dec. 29, 2017

(65) Prior Publication Data

US 2018/0121498 A1    May 3, 2018

Related U.S. Application Data

(63) Continuation of application No. 14/870,523, filed on Sep. 30, 2015, now Pat. No. 9,881,054.

(51) Int. Cl.
| | |
|---|---|
| *G06F 16/242* | (2019.01) |
| *G06F 16/21* | (2019.01) |
| *G06F 16/9535* | (2019.01) |
| *G06F 16/28* | (2019.01) |
| *G06F 16/245* | (2019.01) |

(52) U.S. Cl.
CPC ........ *G06F 16/2423* (2019.01); *G06F 16/211* (2019.01); *G06F 16/245* (2019.01); *G06F 16/289* (2019.01); *G06F 16/9535* (2019.01)

(58) Field of Classification Search
CPC ............... G06F 16/2453; G06F 16/211; G06F 16/9535; G06F 16/289
USPC ........................................................ 707/731
See application file for complete search history.

(56) References Cited

U.S. PATENT DOCUMENTS

| | | |
|---|---|---|
| 8,606,407 B2 | 12/2013 | White, III et al. |
| 8,732,213 B2 | 5/2014 | Sowell et al. |
| 2009/0119254 A1 | 5/2009 | Cross et al. |
| 2010/0036831 A1 | 2/2010 | Vemuri et al. |
| 2012/0150913 A1 | 6/2012 | De Smet et al. |
| 2013/0086104 A1 | 4/2013 | Morrison et al. |
| 2014/0068639 A1 | 3/2014 | Schrock et al. |

(Continued)

*Primary Examiner* — Shahid A Alam
(74) *Attorney, Agent, or Firm* — Fleit Intellectual Property Law; Jose Gutman

(57) ABSTRACT

An information processing system, a computer readable storage medium, and a method of managing a query to find a set of JSON documents in a multi-schema JSON document store. A query engine receives a first query to find at least one JSON document in a plurality of sets of JSON documents stored in the JSON document store, each set of JSON documents being organized in a unique JSON schema version related to a unique JSON schema version of each other set of JSON documents by at least one schema change. The first query is organized in a first unique JSON schema version. A query translator translates the first query into a plurality of queries based on the plurality of schema changes. The first and the plurality of queries are executed to provide a collective set of query results.

20 Claims, 8 Drawing Sheets

(56) References Cited

U.S. PATENT DOCUMENTS

| | | |
|---|---|---|
| 2014/0279834 A1 | 9/2014 | Tsirogiannis et al. |
| 2014/0280047 A1 | 9/2014 | Shukla et al. |
| 2015/0058317 A1* | 2/2015 | Charlot ................ G06F 16/248 707/722 |
| 2015/0161199 A1 | 6/2015 | Pinko |
| 2015/0220327 A1 | 8/2015 | Poon et al. |
| 2015/0379058 A1 | 12/2015 | Chen et al. |

\* cited by examiner

FIG. 4

| OP | Delta(S1,S2) | Example |
|---|---|---|
| add(key) | add(S2.title) | S1.title = null |
| delete(key) | N.A. | N.A. |
| rename(key1, key2) | rename(S1.content, S2.blog) | blog like "%kafka" -> content like "%kafka" |
| type(atom, obj) | type(S1.name, S2.{name: {first_name, last_name}}) | author.name = "xu linhao" -> {first_name + last_name} contains "xu" or "linhao" |
| type(obj, atom) | N.A. | N.A. |
| type(atom, array) | cond(atom) in cond(array) | year = 1999 -> 1999 in [years.value] |
| type(array, atom) | N.A. | N.A. |

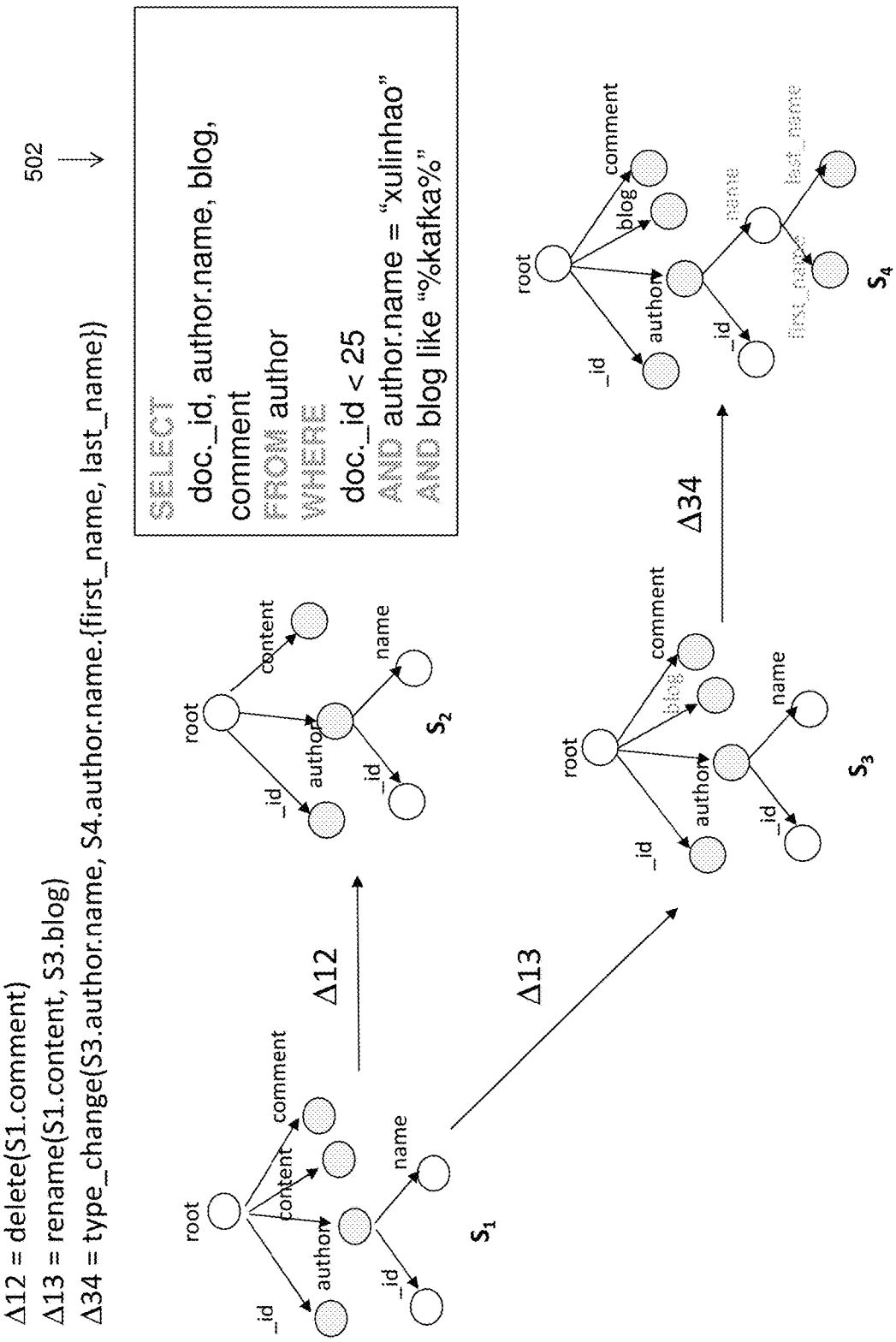

Example of Query S3 - Continued

Δ12 = delete(S1.comment)
Δ13 = rename(S1.content, S3.blog)
Δ34 = type_change(S3.author.name, S4.author.name.{first_name, last_name})

```
SELECT
  doc_id, author.name, blog,
  comment
FROM author
WHERE
  doc_id < 25
  AND author.name = "xulinhao"
  AND blog like "%kafka%"
```

QA          = {doc_id, author.name, blog}

QA$_{common}$(S1) = {doc_id, author.name}
QA$_{delta}$(S1)  = {content like "%kafka"}

QA$_{common}$(S2) = {doc_id}
QA$_{delta}$(S2)  = {}

QA$_{common}$(S4) = {doc_id, blog}
QA$_{delta}$(S4)  = {author.name.{first_name, last_name}}

Example of Query S3 - Continued

Δ12 = delete(S1.comment) ← 702
Δ13 = rename(S1.content, S3.blog)
Δ34 = type_change(S3.author.name, S4.author.name.{first_name, last_name})

Translate Query From S3 to S1

QA = {doc._id, author.name, blog}
$QA_{common}(S1)$ = {doc._id, author.name}
$QA_{delta}(S1)$ = {content like "%kafka"} ← 704

Original Query Q on S3 ← 502

```
SELECT
  doc_id, author.name, blog, comment
FROM author
WHERE
  doc._id < 25
  AND author.name = "xulinhao"
  AND blog like "%kafka%"
```
← 708

Δ13 

Translated Q' on S1 ← 706

```
SELECT
  doc._id, author.name, content as blog,
  comment
FROM author
WHERE
  doc._id < 25
  AND author.name = "xulinhao"
  AND content like "%kafka%"
```
← 710

FIG. 8

Input: — 802
  (1) a user-selected JSON schema S (e.g., S3)
  (2) a query Q against S    For example:    502

```
SELECT
  doc._id, author.name, blog, comment
FROM author
WHERE
  doc._id < 25
  AND author.name = "xulinhao"
  AND blog like "%kafka%"
```

Method: — 804

— Let R be an empty result set — 806
— Get schema change path set (e.g., {Δ12, Δ13, Δ34}) — 808
— For each schema change path Δ — 810
— Translate Q into Q' with Δ — 812
— R' = Execute Q' — 814
— R = R U R' — 816
— Format R with S — 818
— Return R — 820

SYSTEM AND METHOD OF QUERY PROCESSING WITH SCHEMA CHANGE IN JSON DOCUMENT STORE

BACKGROUND

The present disclosure generally relates to query processing in database systems, and more particularly relates to a method and system for processing queries in a multi-schema JSON document store.

JSON document stores (e.g., Cloudant and MongoDB) are widely applied in backend data storage systems for many types of applications, such as mobile and web-based applications. In these types of applications, developers often release applications, updates, and upgrades, as quickly as possible. Such application products are often released in an iterative way in which a previous schema used for storing application data is changed or evolved to a new schema. This creates a serious data management problem in which each release increases the number of different versions of related schemas for various data files used by the iterative releases of an application product.

To try to solve the schema change problem for such application products, a conventional solution has used a schema-mapping tool (e.g., Apple iCloud xcode) to migrate all data to the new schema. This migration exercise involves great effort of engineering work and data migration cost. In other words, such traditional solutions cannot support multi-version schema based applications. Even worse, during the process of data migration, the service typically suffers from a service downtime.

Applications, such as mobile and web-based applications, that use JSON documents stored in JSON document stores, have been able to freely adjust their JSON document schema with requirement changes of the user application, and without involving data migration costs. Unfortunately, such applications suffer from the problem of supporting multiple versions of schemas for JSON documents stored in a JSON document store.

BRIEF SUMMARY

According to one embodiment of the present disclosure, a method for managing a query to find a set of JSON documents in a JSON document store, the method comprising: receiving a first query to find at least one JSON document in a plurality of sets of JSON documents stored in a JSON document store, each set of JSON documents in the plurality being organized in a unique JSON schema version related to a unique JSON schema version of each other set of JSON documents in the plurality of sets of JSON documents by at least one schema change, the first query being organized in a first unique JSON schema version from a plurality of unique JSON schema versions of the respective plurality of sets of JSON documents; maintaining a schema change graph of a plurality of schema changes between respective pairs of the plurality of unique JSON schema versions; translating the first query into a plurality of queries based on the plurality of schema changes, wherein each of the plurality of queries is organized in a respective unique JSON schema version from the plurality of unique JSON schema versions; executing the first query, organized in the first unique JSON schema version, on a first set of JSON document in the plurality of sets of JSON documents to provide a first query result, where the first set of JSON documents is organized in the first unique JSON schema version; executing each of the plurality of queries, each query organized in a respective unique JSON schema version, on a respective one of the plurality of sets of JSON documents to provide a respective one of a plurality of query results, where the each of the plurality of sets of JSON documents is organized in the respective each unique JSON schema version; collecting the first query result and the plurality of query results into a collective set of query results; and returning the collective set of query results.

According to another embodiment of the present disclosure, an information processing system is capable of managing a received query to find a set of JSON documents in a multi-schema JSON document store, the information processing system comprising: a memory; a JSON document store for storing a plurality of sets of JSON documents where each set of JSON documents in the plurality being organized in a unique JSON schema version related to a unique JSON schema version of each other set of JSON documents in the plurality by at least one schema change; a query engine for executing queries against the plurality of sets of JSON documents; a query translator for translating a first query into a plurality of queries based on the plurality of schema changes, the first query being organized in a first unique JSON schema version from a plurality of unique JSON schema versions of the respective plurality of sets of JSON documents; a schema tracker for maintaining a schema change graph of a plurality of schema changes between respective pairs of the plurality of unique JSON schema versions; and a processor, communicatively coupled with the memory, the JSON document store, the query engine, the query translator, and the schema tracker, the processor, responsive to computer instructions, performing a method to find a set of JSON documents in a JSON document store, the method comprising: receiving the first query to find at least one JSON document in the plurality of sets of JSON documents stored in the JSON document store; translating the first query into a plurality of queries based on the plurality of schema changes, wherein each of the plurality of queries is organized in a respective unique JSON schema version from the plurality of unique JSON schema versions; executing the first query, organized in the first unique JSON schema version, on a first set of JSON document in the plurality of sets of JSON documents to provide a first query result, where the first set of JSON documents is organized in the first unique JSON schema version; executing each of the plurality of queries, each query organized in a respective unique JSON schema version, on a respective one of the plurality of sets of JSON documents to provide a respective one of a plurality of query results, where the each of the plurality of sets of JSON documents is organized in the respective each unique JSON schema version; collecting the first query result and the plurality of query results into a collective set of query results; and returning the collective set of query results.

According yet to another embodiment of the present disclosure, a computer readable storage medium comprises computer instructions which, responsive to being executed by a processor, cause the processor to perform operations to find a set of JSON documents in a JSON document store, the operations comprising: non-transitory computer readable storage medium, comprising computer instructions which, responsive to being executed by a processor, cause the processor to perform operations to find a set of JavaScript Object Notation (JSON) documents in a JSON document store, the operations comprising: receiving a first query to find at least one JSON document in a plurality of sets of JSON documents stored in a JSON document store, each set of JSON documents in the plurality being organized in a unique JSON schema version related to a unique JSON schema version of each other set of JSON documents in the plurality of sets of JSON documents by at least one schema change, the first query being organized in a first unique JSON schema version from a plurality of unique JSON schema versions of the respective plurality of sets of JSON documents; maintaining a schema change graph of a plurality of schema changes between respective pairs of the plurality of unique JSON schema versions; translating the first query into a plurality of queries based on the plurality of schema changes, wherein each of the plurality of queries is organized in a respective unique JSON schema version from the plurality of unique JSON schema versions; executing the first query, organized in the first unique JSON schema version, on a first set of JSON document in the plurality of sets of JSON documents to provide a first query result, where the first set of JSON documents is organized in the first unique JSON schema version; executing each of the plurality of queries, each query organized in a respective unique JSON schema version, on a respective one of the plurality of sets of JSON documents to provide a respective one of a plurality of query results, where the each of the plurality of sets of JSON documents is organized in the respective each unique JSON schema version; collecting the first query result and the plurality of query results into a collective set of query results; and returning the collective set of query results.

BRIEF DESCRIPTION OF THE SEVERAL VIEWS OF THE DRAWINGS

The accompanying figures, in which like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 4 is a table listing various possible operations that can be performed on a first schema to effect a schema change to a second schema; also illustrating various examples of schema change operations;

FIGS. 5, 6, and 7, illustrate an example process to translate a query in a first schema to a translated query in a second schema that is different than the first schema, according to various embodiments of the present disclosure.

FIG. 8 is an example operational sequence to execute a given query, expressed in a user-selected JSON schema, against multi-versioned JSON documents in a JSON document store to provide a result of the executed given query, according to various embodiments of the present disclosure.

DETAILED DESCRIPTION

Figure 1:
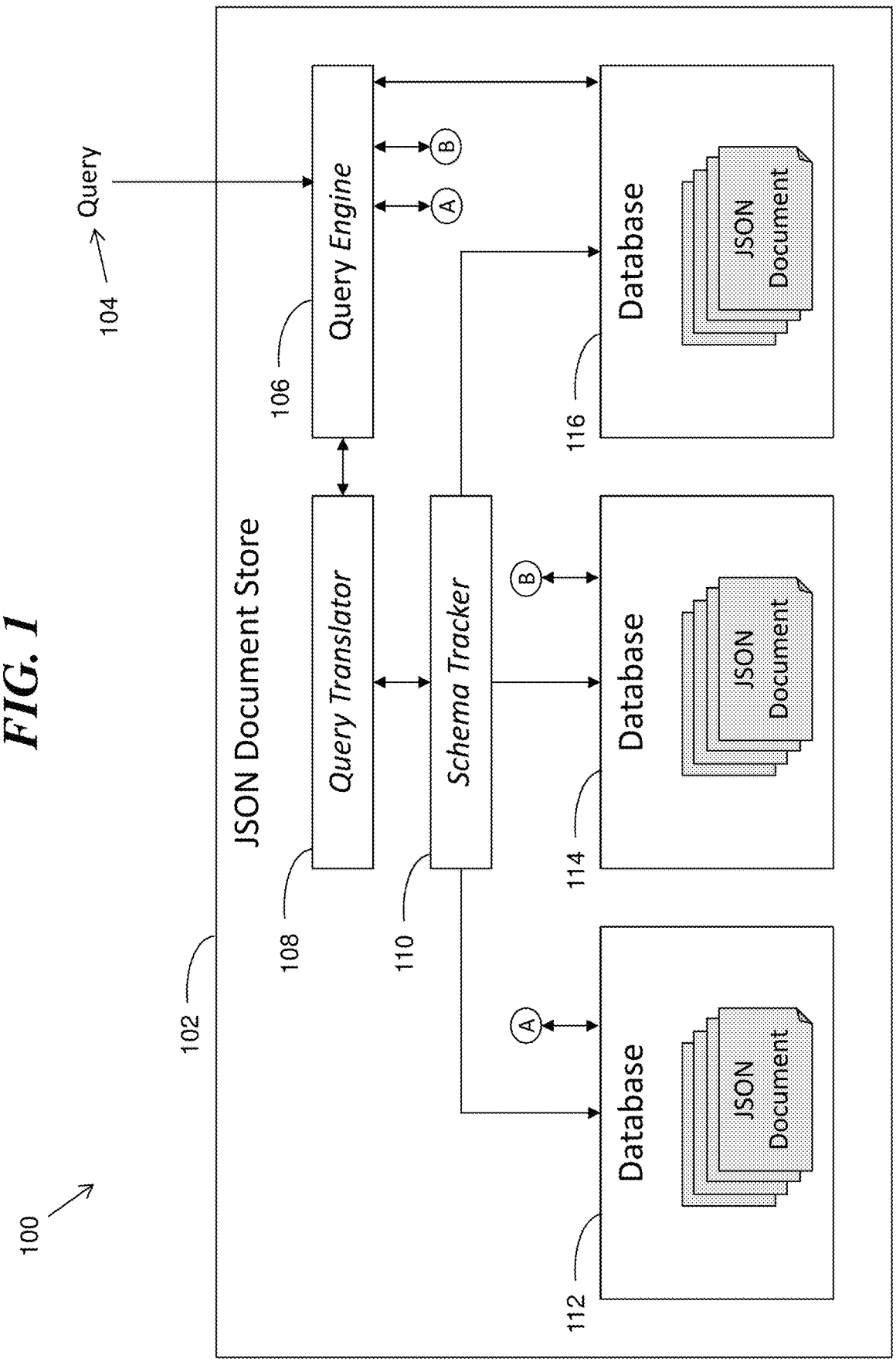
FIG. 1 is a block diagram illustrating an example of a JSON document store in an information processing system, according to various embodiments of the present disclosure.

According to various embodiments of the present disclosure, disclosed is a system and method to enable mobile and web applications to transparently access multi-versioned JSON documents. Specifically, according to an example, given a set of JSON documents whose schemas are evolved, an information processing system can enable a user to query all relevant JSON documents stored in a JSON document store against a given schema that the user will use to create the query. In other words, a user only issues a query in a given schema S, without considering the schema changes of all schemas of relevant JSON documents in the JSON document store. The information processing system, according to the example, then can return all results (i.e., all relevant JSON documents) to the user by transparently translating the query conditions expressed in the given schema S to all JSON document schemas of the JSON documents stored in the JSON document store. In this way, the problem of data migration and service downtime can be avoided. Additionally, application developers are saved from the burden of managing schema changes of JSON documents used by the applications.

An information processing system, according to various embodiments of the present disclosure, enables transparent query processing with schema changes in JSON document stores, which automatically transforms the query conditions on a given schema, such as a user-selected schema, into the corresponding query conditions on all relevant JSON document schemas for the actual query execution. Specifically, according to an example, a method of transparent query processing based on schema changes includes three main steps, based on being given the inputs of 1) the schema changes between the multiple versions of schemas of JSON documents stored in a JSON document store, and 2) a schema of a query to be executed against the sets of JSON documents in the JSON document store, the schema being selected from the multiple versions of schemas.

In the first step, from the selected schema of the query to be executed, traverse the whole schema change graph in a breadth-first search manner. Although a breadth-first search manner is used in this example other ways of traversing the whole schema change graph are possible within the scope of the present disclosure.

In the second step, for each schema visited in the schema change graph, divide query conditions into common query conditions and delta query conditions. The common query conditions follow the same schema sub-structure (e.g., organization) while traversing across the schema change graph. On the other hand, the delta query conditions reflect the changes of the schema while traversing the schema change graph. The delta query conditions are transformed into corresponding query conditions according to the currently visited schema in the schema change graph.

In the third and final step, all transformed queries based on schema changes are executed on the corresponding sets of JSON documents stored in the JSN document store. The results of the queries can be formatted (e.g., organized) based on the selected schema of the query to be executed.

A discussion of various embodiments of the present disclosure will be provided below illustrating in more detail several examples.

Referring to FIG. 1, an example of a JSON document store 102 is shown communicatively coupled with an information processing system 100. The JSON document store 102 comprises a query engine 106, a query translator 108 communicatively coupled with the query engine 106, and a schema tracker 110, communicatively coupled with the query translator 108. These elements of the JSPN document store 102 will be discussed in more detail below.

The JSON document store 102 comprises one or more sets of JSON documents 112, 114, 116, which may be organized as one or more databases 112, 114, 116. According to the present example, the query engine 106 receives a query 104 from an external source, such as a user of the JSON document store or from another system. The query engine 106 then executes the received query by searching the one or more sets of JSON documents 112, 114, 116, to find JSON documents matching the received query's conditions, as shown in FIG. 1.

A first set of JSON documents 112 may be organized according to a first unique JSON schema. A second set of JSON documents 114 may be organized according to a second unique JSON schema. A third set of JSON documents 116 may be organized according to a third unique JSON schema. The first JSON schema, the second JSON schema, and the third JSON schema are different versions of each other. A schema change graph (not shown) can be created that maps a path of schema changes while traversing the schema change graph from one of the three JSON schema versions to another one of the three JSON schema versions.

In this example, a schema tracker 110 tracks the different schemas for the one or more sets of JSON documents 112, 114, 116. Additionally, according to the present example, the schema tracker 110 maintains a representation of a schema change graph (not shown), which can be maintained in a table or a linked list of schema changes (e.g., list of delta schemas) between pairs of the different schemas for the one or more sets of JSON documents 112, 114, 116. In this way, the schema tracker 110 can quickly traverse a schema change path (through the schema change graph) to determine a schema change a pair of the different schemas tracked for the first JSON schema, the second JSON schema, and the third JSON schema. Of course, FIG. 1 illustrates an example showing only three schemas for simplicity. It should be clear that such a schema tracker 110, according to various embodiments, can be used to quickly traverse a path through a very large and complex schema change graph.

A query translator 108 interoperates with the query engine 106 and with the schema tracker 110 to translate an incoming query 104 received by the query engine 106. The incoming query 104 is translated to a different query corresponding to another one of the unique JSON schemas of the sets of JSON documents 112, 114, 116. As will be discussed in more detail below, the incoming query 104 can be processed by the query translator 108 to provide a plurality of different queries corresponding to the respective unique schemas of the one or more sets of JSON documents 112, 114, 116.

The query engine 106 receives the translated query from the query translator and then executes the translated query against the corresponding one of the sets of JSON documents 112, 114, 116. That is, each translated query corresponds to the unique schema of a particular one of the set of JSON documents 112, 114, 116, against which the query engine 106 can execute the translated query to find JSON documents matching the translated query conditions. In this way, the query engine 106 can return results of the search of the incoming query 104, which includes the corresponding searches of the translated queries for the other unique schemas of the other respective sets of JSON documents 112, 114, 116.

Figure 2:
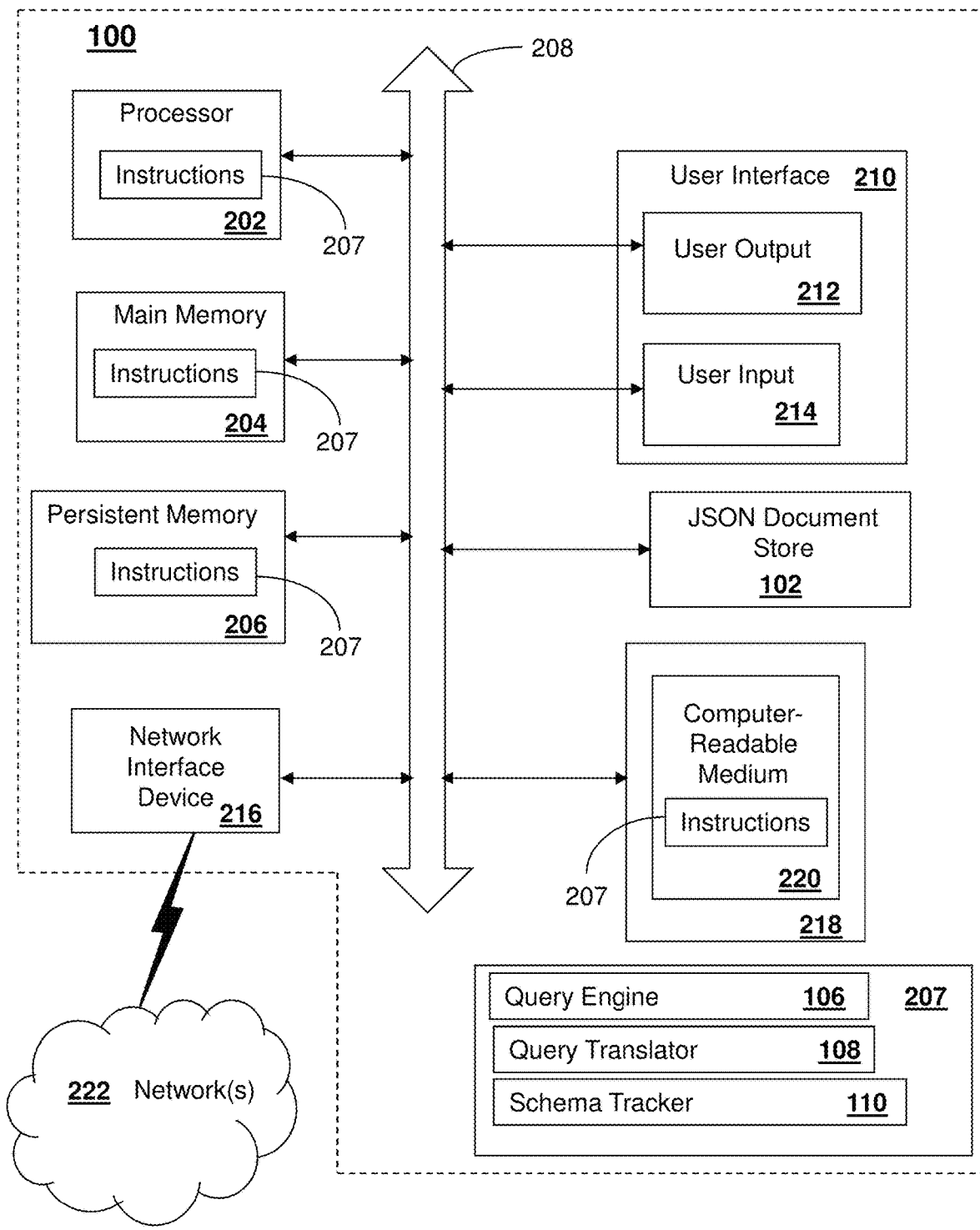
FIG. 2 is a block diagram illustrating an example of the information processing system of FIG. 1.

As shown in FIG. 2, an information processing system 100 is communicatively coupled with the JSON document store 102. According to this example, at least one processor 202, responsive to executing instructions 207, performs operations to communicate with the JSON document store 102 via a bus architecture 208, as shown. The at least one processor 202 is communicatively coupled with main memory 204, persistent memory 206, and a computer readable medium 220.

The computer readable medium 220, according to the present example, is communicatively coupled with a reader/writer device 218 that is communicatively coupled via the bus architecture 208 with the processor 202. The instructions 207, which can include instructions, configuration parameters, and data, may be stored in the computer readable medium 220, the main memory 204, the persistent memory 206, and in the processor's internal memory such as cache memory and registers, as shown.

The information processing system 100 includes a user interface 210 that comprises a user output interface 212 and user input interface 214. Examples of elements of the user output interface 212 can include a display, a speaker, one or more indicator lights, one or more transducers that generate audible indicators, and a haptic signal generator. Examples of elements of the user input interface 214 can include a keyboard, a keypad, a mouse, a track pad, a touch pad, a microphone that receives audio signals. The received audio signals, for example, can be converted to electronic digital representation and stored in memory, and optionally can be used with voice recognition software executed by the processor 202 to receive user input data and commands.

A network interface device 216 is communicatively coupled with the processor 202 and provides a communication interface for the information processing system 100 to communicate via one or more networks 222. The networks can include wired and wireless networks, and can be any of local area networks, wide area networks, or a combination of such networks. For example, wide area networks including the internet and the web can inter-communicate the information processing system 100 with other one or more information processing systems that may be locally, or remotely, located relative to the information processing system 100. It should be noted that mobile communications devices, such as mobile phones, Smart phones, tablet computers, lap top computers, and the like, which are capable of at least one of wired and/or wireless communication, are also examples of information processing systems within the scope of the present disclosure.

The instructions 207, according to the present example, include instructions for the query engine 106, instructions for the query translator 108, instructions for the schema tracker 110, and related configuration parameters and data. It should be noted that any portion of the instructions 207 can be stored in a centralized information processing system or can be stored in a distributed information processing system, i.e., with portions of the system distributed and communicatively coupled together over one or more communication links or networks.

Figure 3:
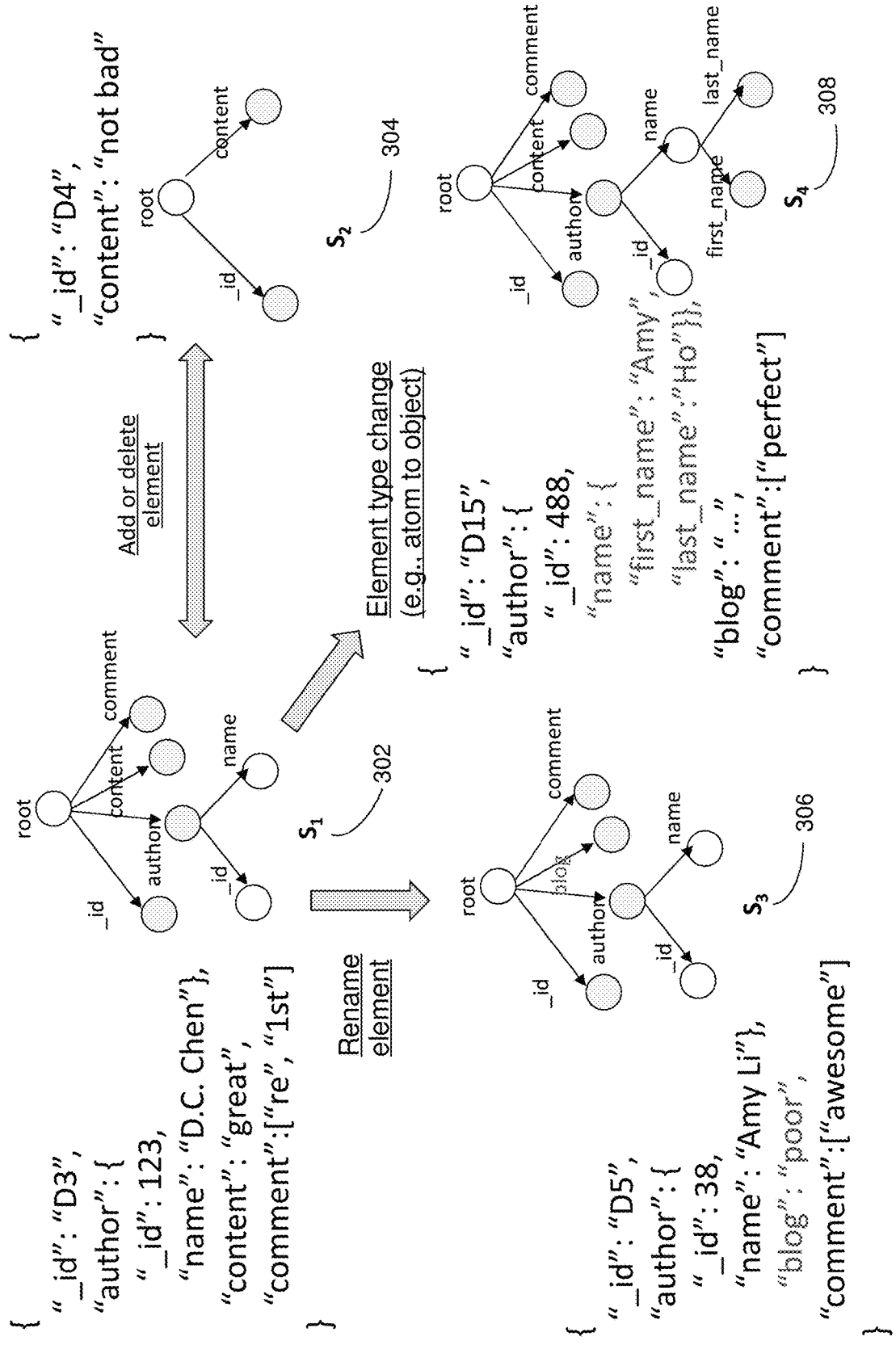
FIG. 3 is a diagram showing examples of schema changes between schemas of JSON documents.

FIG. 3 illustrates examples of schema changes between a first schema 302 and a second schema 304, between the first schema 302 and a third schema 306, and between the first schema 302 and a fourth schema 308. According to a first example, the first schema 302 can have schema elements added or deleted resulting in the second schema 304 as an evolutionary change between the first schema 302 and the second schema 304. That is, a schema of a set of JSON documents organized according to the first schema 302 can be changed to a schema of a second set of JSON documents organized according to the second schema 304, and vice versa, by either addition or deletion of one or more schema elements. The second schema 304, as illustrated in FIG. 3, is a change of the first schema 302 by deletion of the schema elements author and comments.

A change from the first schema 302 to the third schema 306 illustrates a change of the name of an element. In this particular example, the element named "content" is renamed "blog". A change in the reverse direction, i.e., from the third schema 306 to the first schema 302, would change the name of the element "blog" to "content".

A change between the first schema 302 and the fourth schema 308, as shown in FIG. 3, illustrates an element type change. In this particular example, an atomic element is changed to an object element. Specifically, the atomic element "name" in the first schema 302 changes to an object element "name" that is broken up into a first name element coupled with a last name element in the fourth schema 308.

The table in FIG. 4, according to various embodiments of the present disclosure, shows examples of schema change operations for changing from a first schema S1 to a second schema S2. The first column 402 lists a function for the particular change operation. The second column 404 lists how the function for the particular change operation is used. The third column 406 may show an example of how the function can be used.

For example, as shown in the first row of listed operations, the add (key) operation will add an element to the first schema S1 to transform it to the second schema S2. As another example listed in the second row, the delete (key) operation will delete an element from the first schema S1 in its transformation to the second schema S2. As third example listed in the third row, the rename (key 1, key 2) operation renames an element in the first schema S1 to a new name to transform the first schema S1 to the second schema S2. For example, an element named "content" in the first schema S1 can be renamed to "blog" to change the first schema S1 to the second schema S2. An example of using the renaming function in this way is shown in the third column 406.

Other examples of schema change operations are listed in the subsequent rows of the table. These other examples show functions for schema change operations used to change the type of an element in the first schema S1 to transform the first schema S1 to the second schema S2. It should be noted that a JSON document schema version can include any of an object of an unordered set of name/value pairs; and an array of an ordered collection of values; and where each value is a string, a number, a true/false flag, an array or an object. Other examples of schema changes include, as shown in FIG. 4, an atomic element to an object element, an atomic element to an array element, an object element to an atomic element, and an array element to an atomic element.

With reference to FIGS. 5, 6, and 7, an example of a query engine processing an incoming query received formatted (e.g., organized) in the third schema S3 will be discussed below. In this example, there are four unique schema versions S1, S2, S3, and S4, corresponding to four sets of JSON documents stored in a JSON document store. The JSON document store 102 and the information processing system 100 shown in FIGS. 1 and 2, and as have been discussed above, may be generally referred to in the discussion below regarding the example of FIGS. 5, 6, and 7.

The incoming query is formatted (e.g., organized) according to the third schema S3. This incoming query is shown in the box 502 containing the query attributes and conditions. The various sets of JSON documents stored in this JSON document store, according to the present example, are formatted (e.g., organized) according to four unique schema versions S1, S2, S3, and S4, which include three schema changes shown as delta 1-2, delta 1-3, and delta 3-4.

The schema change between the first schema S1 and the second schema S2 (i.e., delta 1-2), comprises deleting from the first schema S1 the element "comment". The schema change between the first schema S1 and the third schema S3, (i.e., delta 1-3), comprises renaming the element "content" in the first schema S1 to "blog" in the third schema S3. The schema change between the third schema S3 and the fourth schema S4, (i.e., delta 3-4), comprises a change in type of an element. In this schema change, delta 3-4, the atomic type of the element "name" in the third schema S3 is changed to an object type of the same element "name" in the fourth schema S4. Specifically, the change to object type of the element "name" in the fourth schema S4 has created a coupling of the element "name" to the two elements "first_name" and "last_name".

According to the present example, the schema tracker 110 keeps track of these three schema changes, i.e., delta 1-2, delta 1-3, and delta 3-4. With reference to FIG. 5, it can be seen that this example of the JSON document store 102 includes four sets of JSON documents that are respectively associated with four unique schemas S1, S2, S3, and S4.

After the query engine 106 receives the incoming query 104, which in this example is a query organized according to the third schema S3 and shown in the box 502, the query engine 106 sends the incoming query 104 to the query translator 108. The query translator 108 will translate the incoming query 104, in the third schema S3, to three other translated queries corresponding to the respective three other unique schemas S1, S2, and S4. In this way, the query engine 106 will have four different queries corresponding to the four unique schemas S1, S2, S3, and S4, to execute against the four sets of JSON documents stored in the JSON document store 104.

According to this example, the query translator 108 communicates with the schema tracker 110 to determine the three different schema changes for translating the incoming query 104 as shown in the box 502, and which is in the third schema S3, to three additional queries in the three other unique schemas S1, S2, and S4. The query translator 108 analyzes the incoming query 104 shown in the box 502 and determines, at step 602, the query attributes of the incoming query 502.

The query translator 108 then determines, at step 604, based on the schema change from the third schema S3 to the first schema S1, the common query attributes, i.e., that remain unchanged after translating from the third schema S3 to the first schema S1, and the delta query attributes, i.e., that change after the translation from the third schema S3 to the first schema S1. In this case, a query attribute is changed to change the name of the schema element "blog" to "content."

As can be seen in FIG. 6, the schema change from the first schema S1 to the second schema S2 results in the schema element named "comment" being deleted from the first schema S1 to transform the first schema S1 to the second schema S2. Accordingly, the query translator 108 determines, at step 606, based on the schema change path from the third schema S3 to the second schema S2, to change a first query attribute to change a schema element name from "blog" to "content" and to change a second query attribute to delete the schema element named "comment".

The query translator 108 determines, at step 608, the common query attributes and the delta query attributes in translating the query from the third schema S3 to the fourth schema S4. In this case, the atomic type element named "author.name" in the third schema S3 is changed to an object type element "author.name" which is coupled to two added sub-elements "frist_name" and "last_name". In this way, the query translator 108 is able to translate the incoming query received formatted in the third schema S3 to three other queries formatted in the three other schemas S1, S2, and S4. In this way, the query engine 106 will have four different queries corresponding to the four unique schemas S1, S2, S3, and S4, to execute against the four sets of JSON documents stored in the JSON document store 104.

FIG. 7 illustrates a detailed example of how the incoming query 104 can be translated from the third schema S3 to the first schema S1. The query translator 108 communicates with the schema tracker 110, to retrieve and analyze a representation of a schema change graph (see FIG. 5 for a representation of an example schema change graph) which is maintained by the schema tracker 110. The query translator 108, based on the analysis, determines 702 that the schema change delta 1-3 should be applied in a translation of the incoming query 104 from the third schema S3 to the first schema S1. The query translator 108 determines the query attributes of the incoming query 104 in the third schema S3. Then, the query translator 108, based on the schema change delta 1-3, identifies the common query attributes that will not change in the translation from the third schema S3 to the first schema S1. The query translator 108, based on the schema change delta 1-3, also identifies 704 the query attributes that will change in the translation. The schema change from the third schema S3 to the first schema S1 comprises renaming the schema element 'blog' to "content".

Then, as shown in FIG. 7, the query translator 108 translates the incoming query Q 104, as shown in the first box 502, to the translated query Q' as shown in the second box 706, by changing the query attribute 708 that uses the schema element name "blog" to a query attribute 710 that uses the changed schema element name "content". The translated query Q' is now compatible with the first schema S1 such that the translated query Q' can be executed by the query engine 106 to search the set of JSON documents formatted on the first schema S1.

In this way, the translation process as illustrated above can use one or more of the schema changes, i.e., delta 1-2, delta 1-3, and delta 3-4, from the schema change graph to determine three schema change paths starting on the third schema S3 and traversing the schema change graph to arrive at each of the other three schemas S1, S2, and S4. The three schema change paths can be used to translate the incoming query Q 104, in the third schema S3, to three other translated queries Q' respectively in the three other unique schemas, i.e., the first schema S1, the second schema S2, and the fourth schema S4. The query engine 106 then can use each of the four queries, i.e., the incoming query Q and the three other translated queries Q', to search each of the corresponding four sets of JSON documents in the JSON document store. A query in a corresponding schema of one of the four sets of JSON documents in the JSON document store can be executed against the corresponding set of JSON documents.

After all four queries are executed against their corresponding sets of JSON documents, the query engine 106 can format the four results of the four queries in the format of the incoming query 104, i.e., in the third schema S3. In response to the incoming query 104, the query engine 106 can return a collection of the four results, formatted in the format of the incoming query 104, i.e., in the third schema S3. That is, a user can submit to the JSON document store 102 a query in a user-selected schema, then all of the four queries are transparently executed against all sets of JSON documents in the JSON document store, and the collective results are returned to the user in the format of the user-selected schema.

FIG. 8 illustrates an example of a query execution process that may be followed by the at least one processor 202 while implementing the JSON document store 102, according to various embodiments of the present disclosure. In this example, the processor 202 receives user input via the user input interface 214 that provides a user-selection of a JSON schema version, for example the third schema S3, and provides a query Q formatted (e.g., organized) according to the third schema S3. Such an example of a query in the third schema S3 is shown in the box 502.

After receiving the input 802, the processor 202 performs the following method 804. The processor 202, at step 806, initializes a result set to "empty result set" and then proceeds, at step 808, to get the schema change path set, for example the delta schema 1-2, delta schema 1-3, and delta schema 3-4 as shown in FIG. 5. The processor 202, at step 810, repeats the following steps 812, 814, and 816, for each of the schema change paths between the schema of the input query, e.g., the third schema S3, and each of the other schema versions S1, S2, and S4.

Along with executing the incoming query Q, corresponding to the third schema S3, each of the translated queries Q' corresponding to each of the other schemas S1, S2, and S4, is executed to provide a result 814. Each result is then combined with the previous collective result set, at step 816. After the incoming query Q, corresponding to the third schema S3, and all the translated queries Q', corresponding to the schema change paths to the other schemas S1, S2, and S4, have been executed, the processor 202, at step 818, formats the collected results from all the executed queries in the format of the input query schema, e.g., the third schema S3. The processor 202 then, at step 820, returns the collective result of all the queries, formatted according to the third schema S3. In this way, a query in a user-selected schema can be submitted to a JSON document store 102, the query is translated to other queries corresponding to schemas of various sets of JSON documents, all the queries are executed against the respective various sets of JSON documents in the JSON document store, and the collective query results from all the queries are returned. The entire query translation and execution process can be transparently performed by an information processing system 100 without burdening a user with all of the details of the process.

NON-LIMITING EXAMPLES

The present invention may be a system, a method, and/or a computer program product. The computer program product may include a computer readable storage medium (or media) having computer readable program instructions thereon for causing a processor to carry out aspects of the present invention.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer readable program instructions described herein can be downloaded to respective computing/processing devices from a computer readable storage medium or to an external computer or external storage device via a network or networks, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatus (systems), and computer program products according to embodiments of the invention. It will be understood that each block of the flowchart illustrations and/or block functional diagrams, and combinations of blocks in the flowchart illustrations and/or block functional diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or functional block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the computer readable storage medium is shown in an example embodiment to be a single medium, the term "computer readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing or encoding a set of instructions for execution by the machine and that cause the machine to perform any one or more of the methods of the subject disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a computer-readable storage medium, as listed herein and including art-recognized equivalents and successor media, in which the software implementations herein are stored.

Although the present specification may describe components and functions implemented in the embodiments with reference to particular standards and protocols, the disclosure is not limited to such standards and protocols. Each of the standards represents examples of the state of the art. Such standards are from time-to-time superseded by faster or more efficient equivalents having essentially the same functions.

The illustrations of examples described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. The examples herein are intended to cover any and all adaptations or variations of various embodiments. Combinations of the above embodiments, and other embodiments not specifically described herein, are contemplated herein.

The Abstract is provided with the understanding that it is not intended be used to interpret or limit the scope or meaning of the claims. In addition, in the foregoing Detailed Description, various features are grouped together in a single example embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Although only one processor is illustrated for an information processing system, information processing systems with multiple CPUs or processors can be used equally effectively. Various embodiments of the present disclosure can further incorporate interfaces that each includes separate, fully programmed microprocessors that are used to off-load processing from the processor. An operating system (not shown) included in main memory for the information processing system may be a suitable multitasking and/or multiprocessing operating system, such as, but not limited to, any of the Linux, UNIX, Windows, and Windows Server based operating systems. Various embodiments of the present disclosure are able to use any other suitable operating system. Various embodiments of the present disclosure utilize architectures, such as an object oriented framework mechanism, that allows instructions of the components of operating system (not shown) to be executed on any processor located within the information processing system. Various embodiments of the present disclosure are able to be adapted to work with any data communications connections including present day analog and/or digital techniques or via a future networking mechanism.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically. "Communicatively coupled" refers to coupling of components such that these components are able to communicate with one another through, for example, wired, wireless or other communications media. The terms "communicatively coupled" or "communicatively coupling" include, but are not limited to, communicating electronic control signals by which one element may direct or control another. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The terms "controller", "computer", "processor", "server", "client", "computer system", "computing system", "personal computing system", "processing system", or "information processing system", describe examples of a suitably configured processing system adapted to implement one or more embodiments herein. Any suitably configured processing system is similarly able to be used by embodiments herein, for example and not for limitation, a personal computer, a laptop personal computer (laptop PC), a tablet computer, a smart phone, a mobile phone, a wireless communication device, a personal digital assistant, a workstation, and the like. A processing system may include one or more processing systems or processors. A processing system can be realized in a centralized fashion in one processing system or in a distributed fashion where different elements are spread across several interconnected processing systems.

The corresponding structures, materials, acts, and equivalents of all means or step plus function elements in the claims below are intended to include any structure, material, or act for performing the function in combination with other claimed elements as specifically claimed. The description herein has been presented for purposes of illustration and description, but is not intended to be exhaustive or limited to the examples in the form disclosed. Many modifications and variations will be apparent to those of ordinary skill in the art without departing from the scope of the examples presented or claimed. The disclosed embodiments were chosen and described in order to explain the principles of the embodiments and the practical application, and to enable others of ordinary skill in the art to understand the various embodiments with various modifications as are suited to the particular use contemplated. It is intended that the appended claims below cover any and all such applications, modifications, and variations within the scope of the embodiments.

What is claimed is:

1. A computer-implemented method of managing a query to find a set of JavaScript Object Notation (JSON) documents in a JSON document store, the method comprising:
   receiving a first query to find at least one JSON document in a plurality of sets of JSON documents stored in a JSON document store, each set of JSON documents in the plurality being organized in a unique JSON schema version related to a unique JSON schema version of each other set of JSON documents in the plurality of sets of JSON documents by at least one schema change, the first query being organized in a first unique JSON schema version from a plurality of unique JSON schema versions of the respective plurality of sets of JSON documents;
   maintaining a schema change graph of a plurality of schema changes between respective pairs of the plurality of unique JSON schema versions;
   translating the first query into a plurality of queries based on the plurality of schema changes, wherein each of the plurality of queries is organized in a respective unique JSON schema version from the plurality of unique JSON schema versions;
   executing the first query, organized in the first unique JSON schema version, on a first set of JSON document in the plurality of sets of JSON documents to provide a first query result, where the first set of JSON documents is organized in the first unique JSON schema version;
   executing each of the plurality of queries, each query organized in a respective unique JSON schema version, on a respective one of the plurality of sets of JSON documents to provide a respective one of a plurality of query results, where the each of the plurality of sets of JSON documents is organized in the respective each unique JSON schema version;
   collecting the first query result and the plurality of query results into a collective set of query results; and
   returning the collective set of query results.

2. The computer-implemented method of claim 1, further comprising:
   formatting the collective set of query results in the first unique JSON schema version prior to returning the collective set of query results.

3. The computer-implemented method of claim 1, further comprising:
   receiving a user-selection of the first JSON schema version with the first query.

4. The computer-implemented method of claim 1, wherein the plurality of unique JSON schema versions includes one or more of
   an object of an unordered set of name/value pairs; and
   an array of an ordered collection of values; and
   wherein each value is a string, a number, a true/false flag, an array or an object.

5. The computer-implemented method of claim 1, wherein the plurality of schema changes from the first unique JSON schema version to the respective each of the plurality of unique JSON schema versions comprises at least one of adding an element to the first unique JSON schema version and deleting a schema element from the first unique JSON schema version.

6. The computer-implemented method of claim 1, wherein the plurality of schema changes from the first unique JSON schema version to the plurality of unique JSON schema versions comprises renaming a schema element of the first unique JSON schema version.

7. The computer-implemented method of claim 1, wherein the at least one schema change from the first unique JSON schema version to a second unique JSON schema version in the plurality of unique JSON schema versions comprises changing a type of a schema element of the first unique JSON schema version.

8. The computer-implemented method of claim 1, further comprising:
   accessing a schema tracker to retrieve a schema change graph of schema changes between pairs of the plurality of unique JSON schema versions for translating the first query into the plurality of queries based on the at least one schema change.

9. An information processing system that can manage a received query to find a set of JavaScript Object Notation (JSON) documents in a multi-schema JSON document store, the information processing system comprising:
   a memory;
   a JSON document store for storing a plurality of sets of JSON documents where each set of JSON documents in the plurality being organized in a unique JSON schema version related to a unique JSON schema version of each other set of JSON documents in the plurality by at least one schema change;
   a query engine for executing queries against the plurality of sets of JSON documents;
   a query translator for translating a first query into a plurality of queries based on the plurality of schema changes, the first query being organized in a first unique JSON schema version from a plurality of unique JSON schema versions of the respective plurality of sets of JSON documents;
   a schema tracker for maintaining a schema change graph of a plurality of schema changes between respective pairs of the plurality of unique JSON schema versions; and
   a processor, communicatively coupled with the memory, the JSON document store, the query engine, the query translator, and the schema tracker, the processor, responsive to computer instructions, performing a method to find a set of JSON documents in a JSON document store, the method comprising:
      receiving the first query to find at least one JSON document in the plurality of sets of JSON documents stored in the JSON document store;
      translating the first query into a plurality of queries based on the plurality of schema changes, wherein each of the plurality of queries is organized in a respective unique JSON schema version from the plurality of unique JSON schema versions;
      executing the first query, organized in the first unique JSON schema version, on a first set of JSON document in the plurality of sets of JSON documents to provide a first query result, where the first set of JSON documents is organized in the first unique JSON schema version;
      executing each of the plurality of queries, each query organized in a respective unique JSON schema version, on a respective one of the plurality of sets of JSON documents to provide a respective one of a plurality of query results, where the each of the plurality of sets of JSON documents is organized in the respective each unique JSON schema version;

collecting the first query result and the plurality of query results into a collective set of query results; and returning the collective set of query results.

10. The information processing system of claim 9, where the processor, responsive to computer instructions, performing the method comprising:

formatting the collective set of query results in the first unique JSON schema version prior to returning the set of query results.

11. The information processing system of claim 9, where the processor, responsive to computer instructions, performing the method comprising:

receiving a user-selection of the first JSON schema version with the first query.

12. The information processing system of claim 9, wherein the plurality of unique JSON schema versions includes one or more of an object of an unordered set of name/value pairs; and
an array of an ordered collection of values; and wherein each value is a string, a number, a true/false flag, an array or an object.

13. The information processing system of claim 9, wherein the plurality of schema changes from the first unique JSON schema version to the respective each of the plurality of unique JSON schema versions comprises at least one of adding an element to the first unique JSON schema version;

deleting a schema element from the first unique JSON schema version;

renaming a schema element of the first unique JSON schema version; and changing a type of a schema element of the first unique JSON schema version.

14. A non-transitory computer readable storage medium, comprising computer instructions which, responsive to being executed by a processor, cause the processor to perform operations to find a set of JavaScript Object Notation (JSON) documents in a JSON document store, the operations comprising:

receiving a first query to find at least one JSON document in a plurality of sets of JSON documents stored in a JSON document store, each set of JSON documents in the plurality being organized in a unique JSON schema version related to a unique JSON schema version of each other set of JSON documents in the plurality of sets of JSON documents by at least one schema change, the first query being organized in a first unique JSON schema version from a plurality of unique JSON schema versions of the respective plurality of sets of JSON documents;

maintaining a schema change graph of a plurality of schema changes between respective pairs of the plurality of unique JSON schema versions;

translating the first query into a plurality of queries based on the plurality of schema changes, wherein each of the plurality of queries is organized in a respective unique JSON schema version from the plurality of unique JSON schema versions;

executing the first query, organized in the first unique JSON schema version, on a first set of JSON document in the plurality of sets of JSON documents to provide a first query result, where the first set of JSON documents is organized in the first unique JSON schema version;

executing each of the plurality of queries, each query organized in a respective unique JSON schema version, on a respective one of the plurality of sets of JSON documents to provide a respective one of a plurality of query results, where the each of the plurality of sets of JSON documents is organized in the respective each unique JSON schema version;

collecting the first query result and the plurality of query results into a collective set of query results; and returning the collective set of query results.

15. The computer readable storage medium of claim 14, wherein the processor performed operations further comprising:

formatting the collective set of query results in the first unique JSON schema version prior to returning the collective set of query results.

16. The computer readable storage medium of claim 14, wherein the processor performed operations further comprising:

receiving a user-selection of the first JSON schema version with the first query.

17. The computer readable storage medium of claim 14, wherein the plurality of unique JSON schema versions includes one or more of an object of an unordered set of name/value pairs; and
an array of an ordered collection of values; and wherein each value is a string, a number, a true/false flag, an array or an object.

18. The computer readable storage medium of claim 14, wherein the plurality of schema changes from the first unique JSON schema version to the respective each of the plurality of unique JSON schema versions comprises at least one of adding an element to the first unique JSON schema version and deleting a schema element from the first unique JSON schema version.

19. The computer readable storage medium of claim 14, wherein the plurality of schema changes from the first unique JSON schema version to the plurality of unique JSON schema versions comprises renaming a schema element of the first unique JSON schema version.

20. The computer readable storage medium of claim 14, wherein the at least one schema change from the first unique JSON schema version to a second unique JSON schema version in the plurality of unique JSON schema versions comprises changing a type of a schema element of the first unique JSON schema version.

* * * * *